(12) United States Patent
Granger et al.

(10) Patent No.: US 9,389,411 B1
(45) Date of Patent: Jul. 12, 2016

(54) COMPACT ARTICULATING TELESCOPE

(71) Applicant: Lockheed Martin Corporation, Bethesda, MD (US)

(72) Inventors: Zachary Alvis Granger, Redwood City, CA (US); Douglas S. Russum, Sunnyvale, CA (US); David M. Stubbs, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/585,038

(22) Filed: Dec. 29, 2014

(51) Int. Cl.
*G02B 23/16* (2006.01)
*G02B 23/06* (2006.01)

(52) U.S. Cl.
CPC ............... *G02B 23/16* (2013.01); *G02B 23/06* (2013.01)

(58) Field of Classification Search
CPC .............................. G02B 23/16; G02B 23/06
USPC ........................................................ 359/364
See application file for complete search history.

(56) References Cited

U.S. PATENT DOCUMENTS

| 7,534,057 | B2  |   | 5/2009  | Jones et al.            |
|-----------|-----|---|---------|-------------------------|
| 8,115,994 | B2  | * | 2/2012  | Duncan ........ B64G 1/105 |
|           |     |   |         | 359/399                 |
| 2004/0156087 | A1 | * | 8/2004 | Oppenheimer ...... G02B 23/00 |
|           |     |   |         | 359/244                 |
| 2008/0170311 | A1 | * | 7/2008 | Yafuso ............. G02B 17/061 |
|           |     |   |         | 359/852                 |
| 2008/0186569 | A1 | * | 8/2008 | Chen ............... G02B 27/0087 |
|           |     |   |         | 359/399                 |
| 2009/0237784 | A1 |   | 9/2009 | Cook                    |
| 2010/0202073 | A1 | * | 8/2010 | Cook ............. G02B 17/0663 |
|           |     |   |         | 359/858                 |
| 2010/0282942 | A1 | * | 11/2010 | Mosier .............. F41H 13/005 |
|           |     |   |         | 250/203.2               |
| 2011/0234787 | A1 | * | 9/2011 | Tyc .................... G02B 23/00 |
|           |     |   |         | 348/82                  |
| 2012/0300803 | A1 | * | 11/2012 | Kangas ............ F41H 13/0087 |
|           |     |   |         | 372/34                  |

* cited by examiner

*Primary Examiner* — Frank Font
(74) *Attorney, Agent, or Firm* — McDermott Will & Emery LLP

(57) ABSTRACT

An unobscured afocal three-mirror telescope can provide a two-axis gimbal architecture that is more compact, more lightweight, and less expensive than traditional coudé path approaches. The telescope can create a real exit pupil and position the exit pupil on a 90-degree fold mirror. Two orthogonal rotational axes can intersect substantially at or about the center of the telescope's exit pupil and on or about the center of the last fold mirror.

20 Claims, 4 Drawing Sheets

COMPACT ARTICULATING TELESCOPE

CROSS-REFERENCES TO RELATED APPLICATIONS

Not applicable.

STATEMENT REGARDING FEDERALLY SPONSORED RESEARCH OR DEVELOPMENT

Not applicable.

FIELD

The disclosure relates in general to telescope and gimbal design, and in particular to, for example, without limitation, to a compact articulating unobscured telescope design.

BACKGROUND

Common telescope gimbal designs provide telescopes that are mechanically actuated or steered about two axes. Such designs create large fields of regard for the telescope. Earlier designs predominately provide telescopes with central obscurations. For example, coudé optical paths route light from the telescope through the gimbal structure. Further, earlier gimbal designs rely on large brackets (sometimes referred to as yokes) to provide support for the telescope and house motors and bearings of the telescope assembly. These fixtures typically exceed the span of the telescope diameter, which results in a larger envelope and a higher total mass and larger moment of inertia than is often desired.

SUMMARY

The description in this summary section may provide some illustrative examples of the disclosure. This section is not intended to be a broad overview or to identify essential elements of the disclosure.

Some prior telescope designs have attempted to reduce the "on gimbal" mass. However, such designs fail to reduce the total mass of the assembly and continue to use a centrally obscured telescope design.

In accordance with an aspect of at least some embodiments disclosed herein is the realization that prior designs predominately focus on telescopes that have central obscurations, and do not make provision for unobscured telescope designs that are often favored for laser transmission and minimizing diffraction effects when transmitting and receiving signals to and from the target. An aspect of at least some embodiments is the realization that passing the field of view through at least one or more of the motors and bearings used in the gimbals further contributes to the mass and limits the instantaneous telescope field of view of the telescope or results in excessively large hollow bearings and hollow motor drives. Further, an aspect of at least some embodiments is the realization that the commonly long associated path lengths of a coudé focus result in excessively large motor and bearing sizes when the object space field of view begins exceeding 0.5 degrees (which is commonly required for surveillance and tracking applications).

Accordingly, some embodiments herein provide for a telescope assembly having a compact and lightweight articulated gimbal design that reduces total mass, provides unobscured telescope design, and achieves excellent envelope, or packaging efficiencies.

For example, in some embodiments, a gimbal architecture is provided by reconfiguring an unobscured three mirror anastigmat ("TMA") and coudé path such that all of the gimbal structure lies aft of or behind the primary mirror. Locating the gimbal structure behind the primary mirror can allow the associated structure, e.g., the brackets, yoke, bearings, and motors, to be smaller than the diameter of the telescope (thereby reducing mass of the overall assembly).

Further, in some embodiments, the exit pupil can be coincident about the intersection of the X and Y gimbal rotation axes. In addition, some embodiments can be configured such that a fold mirror can be coincident or co-located with the exit pupil. Such embodiments can enhance the capability of the articulated gimbal, enabling the gimbal structure to be designed based on mechanical needs rather than permitting the light beam to pass through components of the gimbal structure. Further, some embodiments can advantageously provide a field of view that is much larger than in prior coudé path telescope systems.

Therefore, in accordance with some embodiments, the gimbal assembly for some embodiments can be made smaller than the telescope diameter, resulting in a more compact gimbal structure. Further, some embodiments centralize the mass of the gimbal assembly, thus yielding improved gimbal moment of inertia and/or reduced angular momentum. Some embodiments can also provide an unobscured telescope design. Some embodiments provide the option to make the last mirror of a fold mirror assembly in the telescope a dejitter mirror or steering mirror. Furthermore, in contrast to prior systems, the optical beam can be required to pass through only one of the X or Y gimbal bearings. Thus, because the optical beam does not pass through the other of the gimbal bearings, one of the motor drives can be made smaller than the beam and need not be hollow, which leads to less expensive and lower mass motor drives.

DETAILED DESCRIPTION

Figure 1:
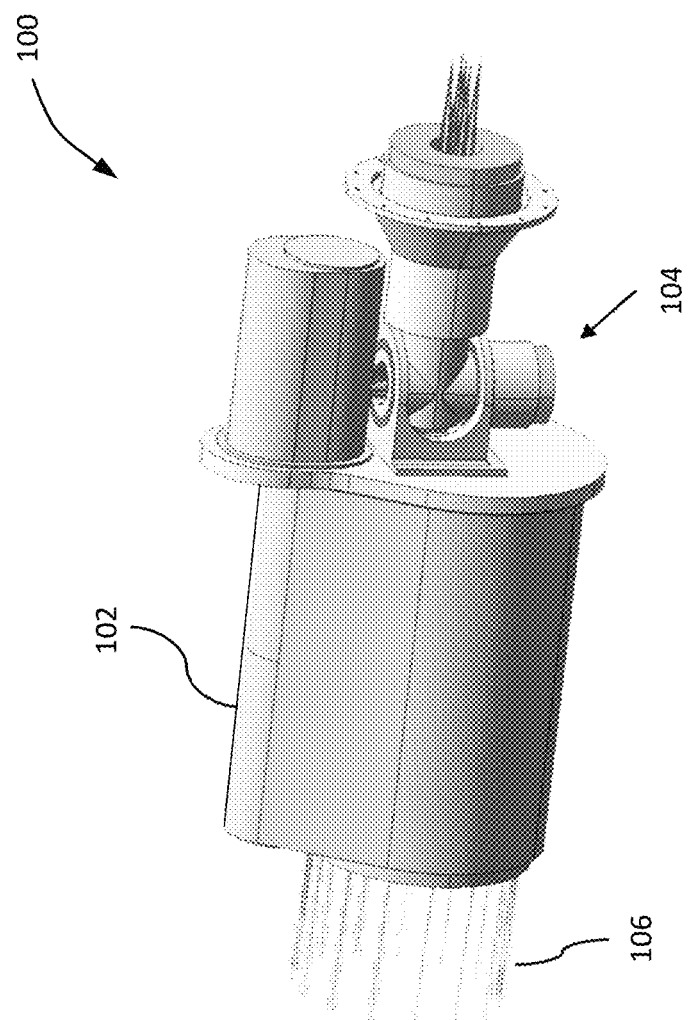
FIG. 1 illustrates a perspective view of a telescope assembly, in accordance with some embodiments.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

As discussed herein, a telescope assembly is provided that achieves numerous advantages over prior telescope assemblies. The telescope assembly can be used for spacecraft applications and therefore achieve the greatest benefit from the size and weight efficiencies achieved by implementing one or more of the aspects of some of the embodiments disclosed herein.

For example, a gimbaled telescope can be provided in accordance with some embodiments. The telescope can be configured such that the gimbal structure is not required to be larger than the telescope diameter. This feature contrasts with prior systems, which generally require large brackets around the outside of the telescope and support the telescope outside of the telescope diameter. Accordingly, some embodiments provide a more compact volume so that the telescope requires a smaller envelope or packaged volume, which can be particularly advantageous for spacecraft applications.

Another advantage in some embodiments is that the gimbal assembly, which can have X and Y gimbals to provide rotation about two axes, can be configured with only one of the two gimbals having a hollow bearing or motor while the other does not. Accordingly, the other of the bearings or motors of one of the gimbals can be sized based on structural need rather than based on a certain diameter required in order to allow a light beam to pass through it, as in prior telescopes. Such prior telescopes sized bearings or motors in order to allow the light beam to pass through both bearings and motors of the gimbal structure, which adds a significant amount of size and mass to the system. This prior strategy—sizing based on light path requirements or to allow beam to pass through—requires large diameter bearings and equally large hollow core motor drives. As such, the large diameter bearings must be robust enough not to twist or go out of plane, thereby increasing their mass. As such, these large diameter bearings must have substantially enough mass even though the bearing does not carry a significant load. An example of such a prior optical system is in U.S. Patent Pub. No. 2009/0237784, filed Sep. 24, 2009, the entirety of which is incorporated herein by reference.

Therefore, an aspect of some embodiments provided herein is the realization that by eliminating the requirement that the light beam passed through the bearing of the gimbal structure, the size of the bearing and mass of the gimbal structure can be reduced because the size of the bearing can be based on structural loading requirements instead of light path requirements.

In accordance with some embodiments, the telescope can comprise a plurality of mirrors in a mirror assembly. Some embodiments can be configured such that the telescope's exit pupil can be located on the last fold mirror of the mirror assembly. As used herein, the "exit pupil" is a location along the beam path where all the points in the instantaneous field of view of the optical system are coincident. By locating the exit pupil on the last fold mirror, some embodiments achieve various advantages.

For example, in contrast to prior systems, with the last fold mirror at the exit pupil, the field of view of the optical system can be contained so that larger fields of view can be supported while using a coudé path design approach. A coudé path design may be defined as a mirror configuration in which light is transferred to a stationary location using one or more mirrors to create bends or "elbows" in the light path. Prior systems that use the coudé path design approach are generally designed to provide very limited field of view (<0.25 degree), as is the case in laser systems. The typically limited field of view in the coudé path design approach is due to beam expansion that occurs along the length of the light path as the beam is reflected from the front of the telescope and routed along the coudé path to the back of the telescope. Due to this beam expansion, prior systems using the coudé path design approach require large gimbal structures in order to achieve large fields of view.

In contrast to these prior systems, some embodiments disclosed herein provide a compact, lightweight design that can implement a coudé path design approach and reduce the gimbal assembly mass. Further, some embodiments disclosed herein can have a wide field of view that exceeds 1 degree, which is substantially larger than common gimbaled telescope designs that allow the telescope to be steered in space while the focal plane and focal plane electronics remain fixed in space (static).

Further, some embodiments can be configured such that the axes of rotation for both of the gimbals intersect at the center of the reflective surface of the last fold mirror. For example, the axes of rotation can intersect at a center of the second fold mirror 158. In addition, by placing the last mirror at the exit pupil, the last mirror can be used as a de-jitter or steering mirror. This advantageous result is possible because in such embodiments, tilting of the last mirror does not result in "beam walk," the situation in which part of the field of view of a beam is lost or no longer reflected off the mirrored surface due to mirror movement.

Furthermore, in some embodiments, the gimbal assembly can have a tracking capability that allows the gimbal to move at a certain acceleration or speed. In some embodiments, with the exit pupil placed at the last mirror, the last mirror of the mirror assembly can be configured as a steering mirror, which can further enhance the capability of a gimbaled telescope. Accordingly, the last mirror can advantageously be used as a steering mirror and provide better accuracy, precision, and excellent response time when compared to a system that relies on steering the entirety of the comparatively large and more massive telescope assembly.

Referring now to the figures, FIG. 1 illustrates an embodiment of a telescope that can be mechanically actuated or steered about two axes. The telescope 100 can comprise a telescope housing 102 and a gimbal assembly 104. The gimbal assembly 104 can comprise a gimbal mounting structure 105 that can be coupled to a vehicle (not shown), such as a space satellite, and be configured to drive movement of the telescope housing 102.

In use, the telescope 100 can receive light 106 through the housing 102. The light 106 can be reflected through a series of one or more powered and/or one or more fold mirrors along a light path that extends through the gimbal assembly 104 and onto a fixed focal plane (not shown). The focal plane, according to some embodiments, can be separate from the telescope 100. For example, the focal plane can be coupled to the vehicle. Further, the focal plane can be maintained at a generally fixed position relative to the vehicle and/or the portion of the gimbal assembly 104 that is coupled to the vehicle. For example, the focal plane can be statically mounted to the vehicle, and therefore decoupled from the motion of the telescope. The benefit of such an embodiment is that the focal plane and its associated electronics do not move while the telescope is moving.

In contrast to prior telescope assemblies, embodiments of the telescope 100 can be configured to eliminate central obscurations and/or to provide a gimbal design that eliminates large brackets (e.g., the gimbal yoke) that typically house motors or bearings and/or provide support for prior telescope assemblies. In some embodiments, coudé optical paths can route the light along the optical path and through the gimbal assembly 104. Accordingly, in some embodiments, the overall mass of the telescope 100 can be greatly reduced compared to prior telescope assemblies (see e.g., U.S. Patent Pub. No. 2009/0237784, which includes large bearings and gimbal yoke 38), especially given the advantageous reductions in gimbal assembly size (e.g., motor size of the gimbal assembly) and elimination of large brackets.

In accordance with some embodiments, the gimbal assembly 104 can lie aft of or behind the housing 102. For example, the gimbal assembly 104 can lie aft of or behind a primary mirror of the telescope 100 located within the housing 102. In some embodiments, the gimbal assembly 104 can be coupled to the rear portion of the housing 102.

Further, the telescope 100 can comprise a series of one or more powered and/or one or more fold mirrors that direct light 106 received into the housing 102 along the optical path in which a secondary mirror lies outside of a beam of light passing through an entrance pupil toward the primary mirror. For example, the illustrated embodiment shows that the entrance pupil is on the primary mirror. This condition isn't required, and the entrance pupil may be located in front of the primary mirror in some embodiments.

Figure 2:
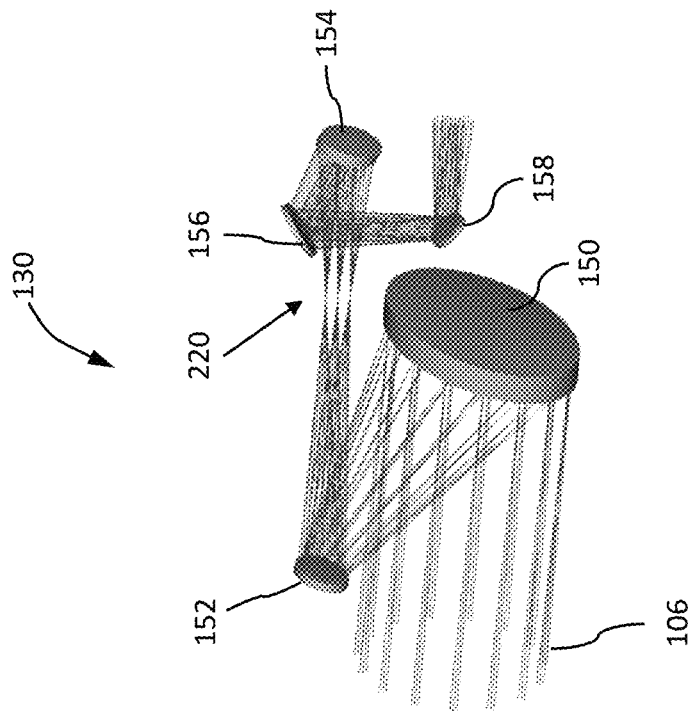
FIG. 2 illustrates a schematic view of a light path layout, in accordance with some embodiments.
Figure 3:
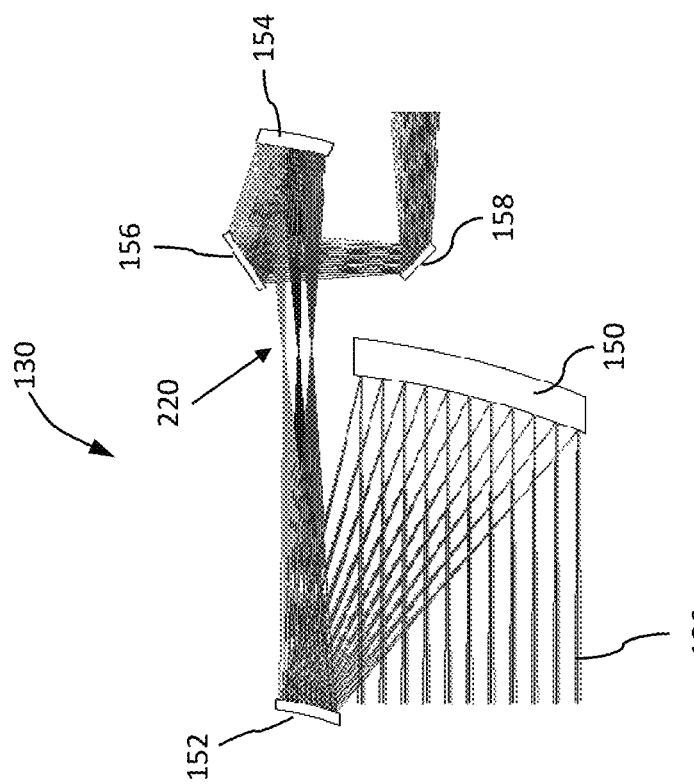
FIG. 3 illustrates a perspective view of the light path layout, in accordance with some embodiments.

FIGS. 2-3 illustrate embodiments of light path layouts that can be used in accordance with some embodiments disclosed herein. FIGS. 2-3 illustrate side and perspective views of a light path layout 130. Other light path layouts can be used in implementing some embodiments disclosed herein.

In each of FIGS. 2-3, light received through an entrance aperture of the telescope is reflected off a primary mirror 150 toward a secondary mirror 152. From the secondary mirror 152, the light is reflected towards a tertiary mirror 154 and so forth until the light has reflected off a first fold mirror 156 and a second fold mirror 158.

With reference to FIG. 2, the light path layout 130 illustrates how some embodiments can contain the field of view expansion or beam footprint size. The light path layout 130 is configured such that the exit pupil is located aft of the primary mirror and contained within the cylinder volume defined by extending a projection of the primary mirror diameter. Locating the exit pupil in close proximity to the gimbals allows for larger optical fields of view (in excess of 1 degree) to be accommodated while maintaining reasonably sized gimbal hardware (motors, bearings, and brackets) (see FIG. 2).

FIGS. 2-3 illustrate alternative views of the light path layout 130. FIG. 2 is a schematic side view of the light path layout 130, and FIG. 3 is a perspective view of the light path layout 130. The light path 130 shown in FIGS. 2-3 is implemented in the embodiment of the telescope 100 shown in FIG. 4. In accordance with some embodiments, one or more of the mirrors can be configured as a powered optic (e.g., having curvature in order to focus light reflected therefrom). In accordance with some embodiments, a telescope with three powered mirrors can be used to form a real exit pupil that is collocated with the last fold mirror.

In the light path layout 130, the focus has been positioned adjacent to a plane of the primary mirror 150. Further, the tertiary mirror 154 is positioned farther behind the primary mirror 150. Thereafter, the first fold mirror 156 directs the light beam toward the primary mirror 150 or longitudinal axis 210. The magnification of the mirrors used in the assembly can be configured such that the exit pupil is positioned behind the primary mirror. Therefore, some embodiments can provide advantageous packaging clearances that allow the gimbals to be contained within a diameter of the telescope.

Figure 4:
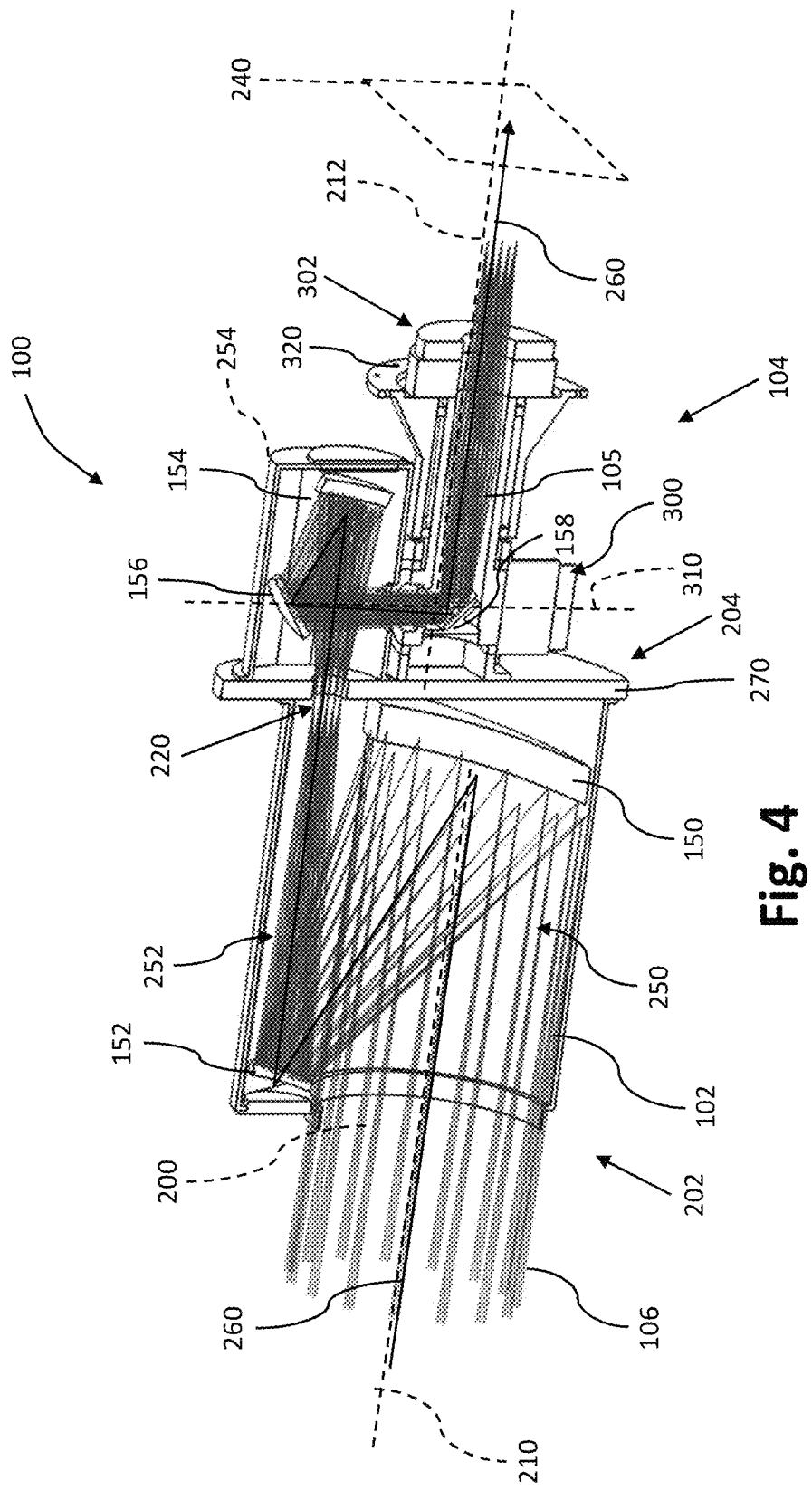
FIG. 4 illustrates a perspective cross-section view of the telescope assembly of FIG. 1 in which the light path layout is implemented, according to some embodiments.

As shown in FIG. 4, the housing 102 can comprise an entrance aperture 200 at a first or front end 202 of the housing 102. The housing 102 can also comprise a second or rear end 204 opposite the first or front end 202. In accordance with some embodiments, the front end of the telescope can be configured such that the entrance pupil 200 comprises a substantially circular shape. In the embodiment of FIG. 4, the entrance pupil 200 is located on the primary mirror 150. However, the entrance pupil 200 can be spaced apart from the primary mirror 150 in some embodiments. Accordingly, light received into the housing 102 can pass through the housing 102 as a column or cylinder of light rays toward the primary mirror 150.

As illustrated, in some embodiments, the primary mirror 150 can be tilted and/or concave such that light 106 reflected off the primary mirror 150 is directed in a path away from a longitudinal axis 210 of the housing 102 (e.g., at an angle with respect to the longitudinal axis 210). The primary mirror 150 may or may not be tilted, but may be offset or displaced from a parent surface vertex, which can cause the light rays to be reflected off-axis or away from the longitudinal axis. Thus, the off-axis movement of the rays may not be caused by tilting the mirror, but may be achieved by offsetting the primary mirror 150 from the primary surface vertex. The telescope configuration in the embodiment shown in FIG. 4 is configured in the form of an off-axis, unobscured TMA consisting of an internal focus, a real exit pupil, and collimated light output. Thus, the light 106 is reflected off the primary mirror 150 and redirected towards a secondary mirror 152. The light reflected off the secondary mirror 152 is focused at a focus 220 and continues toward a tertiary mirror 154. The tertiary mirror 154 reflects the light toward a first fold mirror 156. The first fold mirror 156 then reflects the light toward a second fold mirror 158. The second fold mirror 158 then reflects the light toward a focal plane 240.

In the embodiment illustrated in FIG. 4, the housing 102 can comprise fixturing that enables the primary mirror 150 to be coupled to the housing and oriented at a non-orthogonal angle relative to the longitudinal axis 210. Thus, an optical axis of the primary mirror 150 can extend transversely relative to the longitudinal axis 210.

In some embodiments, the primary mirror 150 can be configured and/or oriented such that light reflected off the primary mirror 150 toward the secondary mirror 152 extends at an angle of between about 30° and about 80° relative to the longitudinal axis 210. In some embodiments, the light can reflect off the primary mirror 150 in angle of between about 35° and about 60°. Further, in some embodiments, the light can reflect off the primary mirror 150 at an angle of between about 40° and about 50°.

In some embodiments, when referring to "light" reflecting at an angle relative to the longitudinal axis 210, the angle of reflectance can be considered to be the angle at which a central ray 260 extends with respect to the longitudinal axis 210 along the optical path. Thus, the central ray 260, as shown in FIG. 4, can extend at about an angle of about 35° to about 40° with respect to the longitudinal axis 210 of the housing 102 when reflected off the primary mirror 150 toward the secondary mirror 152.

Additionally, the tertiary mirror 154 can be configured and/or oriented such that light reflected off the tertiary mirror 154 toward the first fold mirror 156 extends at an angle of between about 30° and about 80°, between about 35° and about 60°, or between about 40° and about 50° relative to the longitudinal axis 210.

The first fold mirror 156 can be configured and/or oriented such that light reflected off the first fold mirror 156 toward the second fold mirror 158 extends at an angle of between about 60° and about 120°, between about 70° and about 100°, or between about 80° and about 90° relative to the longitudinal axis 210.

The second fold mirror 158 can be configured and/or oriented such that light reflected off the second fold mirror 158 toward the focal plane 240 extends at an angle of less than about 10°, less than about 5°, or less than about 2° relative to the longitudinal axis 210 (if the telescope 100 is pointed in a forward look angle direction, as shown in FIG. 4) or a longitudinal axis 212 of the gimbal mounting structure 105 (when the telescope 100 is moved using the gimbal assembly 104 relative to the vehicle). Preferably, light reflected off the second fold mirror 158 toward the focal plane 240 extends substantially parallel relative to the longitudinal axis 210 or the longitudinal axis 212.

The housing 102 can comprise a main tube section 250 in which the light 106 entering through the entrance pupil 200 can be passed toward the primary mirror 150. The main tube section 250 can extend parallel relative to the longitudinal axis 210. Further, the housing 102 can also comprise a secondary tube section 252. The secondary tube section 252 can be positioned adjacent to the main tube section 250. The secondary tube section 252 can house the secondary mirror 152. In accordance with some embodiments, the secondary mirror 152 can be positioned outside of the main tube section 250. For example, as shown in FIG. 4, the secondary tube section 252 can be positioned outside of the main tube section 250 such that the secondary tube section 252 does not intersect with the main tube section 250.

Further, in some embodiments, the secondary tube section can comprise a longitudinal axis that extends generally parallel relative to a longitudinal axis of the main tube section 250. Accordingly, the light reflected through the secondary tube section 252 can be directed such that the central ray 260 in the secondary tube section 252 is substantially parallel relative to the central ray 260 in the main tube 250.

Various embodiments disclosed herein therefore provide for a compact reflecting telescope that has an unobstructed pupil. As shown in the light path layouts 130 of FIGS. 2-3, as well as the implementation of the light path layout 130 in the telescope 100 shown in FIG. 4, the secondary mirror 152 lies outside of the main tube section 250 and therefore does not obstruct or obscure light 106 received through the entrance pupil 200. As such, some embodiments disclosed herein can provide enhanced performance for some applications including transmitting and receiving laser signals. Indeed, various prior telescope designs place a secondary mirror in front of a primary mirror along the longitudinal axis of the telescope such that light entering the telescope is partially blocked by the secondary mirror. Thus, only a portion of the light entering the telescope of prior designs is reflected and visible to the user. As such, some embodiments disclosed herein provide an enormous advantage over prior telescope designs.

FIG. 4 also illustrates that the telescope 100 can comprise a tertiary tube section 254 in which the tertiary mirror 154 and the first fold mirror 156 can be housed. The tertiary tube section 254 can extend along an axis that is generally parallel or coaxial with an axis of the secondary tube section 252. As illustrated in FIG. 4, the housing 102 can be coupled to the tertiary tube section 254 via a mounting bracket 270. The mounting bracket 270 can be coupled to the housing 102 at the second end 204 of the housing 102. In addition, the mounting bracket 270 can be configured to be coupled to the gimbal assembly 104.

The gimbal assembly 104 can comprise a first motor 300 and a second motor assembly 302. The first motor assembly 300 can provide a rotational driving force along a first axis 310. For example, in some embodiments, the first motor assembly 300 can rotate the housing 102 about the first axis 310, which can be an azimuth axis. Thus, as shown in FIGS. 5B-5C, the housing 102 can be rotated within a range of at least 180° in order to point the housing 102 (such as a longitudinal axis of the housing 102) in different directions.

Further, the second motor assembly 302 can drive rotation of the telescope 100 about the longitudinal axis 212. Rotation along or about the axis 212 can cause the first axis 310 to rotate. The telescope can comprise a gimbal interface plate 320, which can be coupled to a vehicle. Thus, the axis 212 can remain in a generally fixed orientation relative to the gimbal interface plate and the vehicle while the first axis 310 can be rotated about the axis 212. This allows all hardware (e.g., electrical, thermal, mechanical, or others) of the sensor and focal plane components to remain stationary while the telescope is commanded to point or slew throughout its angular range. Thus, in FIGS. 5A-5D, the axis 212 remains in a generally fixed orientation relative to the vehicle. However, when the assembly or telescope 100 is rotated about the axis 212, the first axis 310 rotates as well. As such, the telescope 100 can be actuated using the first and second motor assemblies 300, 302 in order to point the telescope 100 in a desired orientation.

As illustrated, the first motor 300 does not have a central aperture through which light passes. Accordingly, in contrast to prior telescope designs, the first motor 300 can be sized based on the mechanical requirements of the telescope rather than based on a certain diameter required to allow a light beam to pass therethrough. Thus, the first motor 300 will tend to be smaller and more compact than motors of prior telescopes.

Figure 5B:
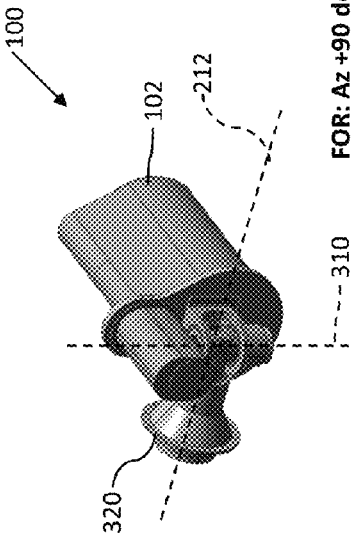
FIGS. 5A-5D illustrate rotational positions of the telescope assembly of FIG. 1 mounted onto a vehicle, according to some embodiments.
Figure 5D:
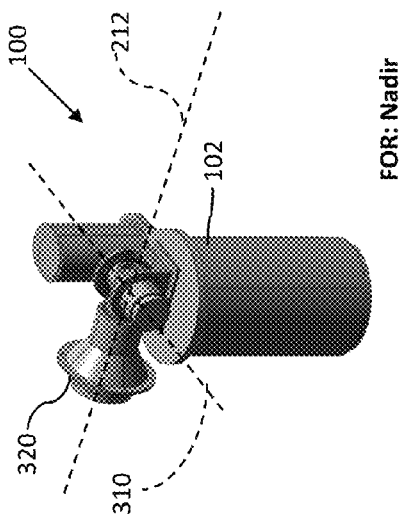
Figure 5A:
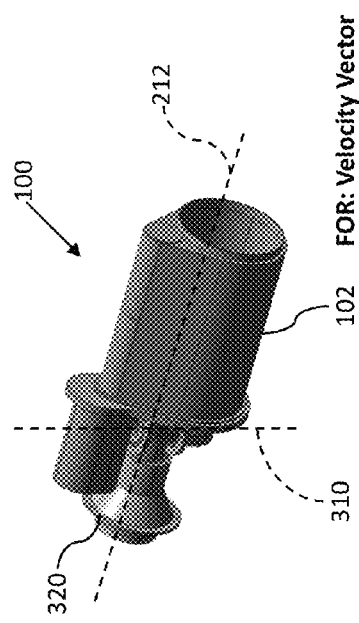
Figure 5C:
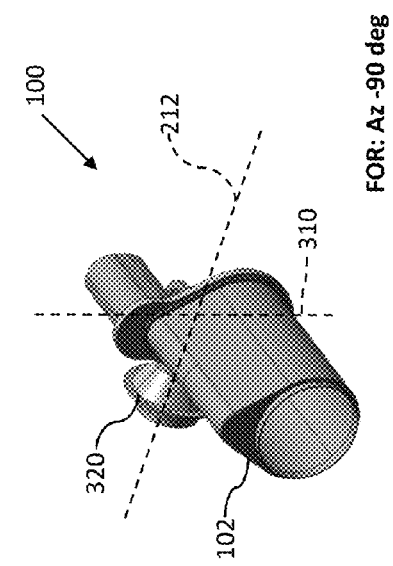

FIGS. 5A-5D illustrate the telescope 100 pointed in various exemplary directions. FIG. 5A shows the telescope 100 pointed in a forward direction. FIG. 5B and 5C illustrate rotational orientations of the telescope 100 in which the telescope is oriented at +90° and −90° azimuth, respectively. Further, FIG. 5D illustrates the telescope 100 pointed in a nadir direction.

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A compact reflecting telescope comprising: a housing defining an entrance pupil and a longitudinal axis; a primary mirror, positioned along the longitudinal axis, configured to reflect light passing through the entrance pupil toward a series of one or more powered and/or one or more fold mirrors such that reflected light passes along a light path toward an exit pupil, wherein the primary mirror is positioned between the entrance pupil and the exit pupil. The entrance pupil can be located in the vicinity of the primary mirror. Further, in some embodiments, the entrance pupil is not defined by the housing. Furthermore, the primary mirror can be configured to reflect light passing through the entrance pupil toward a series of powered mirrors and fold mirrors. For example, in some embodiments, two, three or more powered mirrors can used in the telescope.

Clause 2. The telescope of Clause 1, further comprising a final fold mirror disposed along the light path at the exit pupil, wherein the primary mirror is positioned between the final fold mirror and the entrance pupil. Further, in some embodiments, the entrance pupil can be located on the primary mirror.

Clause 3. The telescope of Clause 2, wherein the light passing through the entrance pupil extends axially within a cylinder of the housing, the cylinder defining a cylinder envelope that extends axially beyond the primary mirror, and wherein the final fold mirror is disposed within the cylinder envelope behind the primary mirror.

Clause 4. The telescope of any of Clauses 2-3, wherein the housing comprises a cross-sectional profile normal to the longitudinal axis, and the exit pupil is positioned within a three-dimensional envelope that (i) extends along the longitudinal axis and (ii) is bounded by a prism having the housing cross-sectional profile.

Clause 5. The telescope of any of the preceding Clauses, wherein the housing comprises a tube.

Clause 6. The telescope of any of the preceding Clauses, further comprising a final fold mirror disposed along the light path at the exit pupil, wherein the final fold mirror comprises a dejitter mirror.

Clause 7. The telescope of any of the preceding Clauses, further comprising a final fold mirror disposed along the light path at the exit pupil, wherein the final fold mirror comprises a steering mirror.

Clause 8. The telescope of any of the preceding Clauses, wherein the exit pupil is positioned behind the primary mirror.

Clause 9. The telescope of any of the preceding Clauses, wherein the housing defines a circular cross-section and the longitudinal axis extends through a center of the circular cross-section, and wherein the exit pupil is spaced apart from the longitudinal axis.

Clause 10. The telescope of any of the preceding Clauses, wherein the series of mirrors comprises two fold mirrors.

Clause 11. The telescope of any of the preceding Clauses, wherein the series of mirrors includes only one fold mirror of about 90°.

Clause 12. The telescope of any of the preceding Clauses, wherein each fold mirror in the series of fold mirrors comprises a diameter that is smaller than a diameter of the preceding fold mirror in the series.

Clause 13. The telescope of any of the preceding Clauses, wherein the series of mirrors comprises secondary and tertiary mirrors and first and second fold mirrors, wherein the second fold mirror has a smaller diameter than the secondary mirror.

Clause 14. The telescope of Clause 13, wherein the second fold mirror has a smaller diameter than the first fold mirror.

Clause 15. The telescope of Clause 14, wherein the second fold mirror has a smaller diameter than the tertiary mirror.

Clause 16. An articulating telescope comprising: a housing comprising an entrance pupil, a rear end opposite the entrance pupil, a longitudinal axis extending between the entrance pupil and the rear end, the housing having a cross-sectional profile normal to the longitudinal axis; and a gimbal assembly coupled to the rear end of the housing, the gimbal assembly having a cross-sectional profile less than the housing cross-sectional profile, the gimbal assembly being configured to provide rotational movement of the housing about at least two axes of rotation.

Clause 17. The telescope of Clause 16, wherein the two axes of rotation intersect the housing longitudinal axis. For example, the two axes of rotation can intersect at a center of the second fold mirror 158.

Clause 18. The telescope of any of Clauses 16-17, wherein the two axes of rotation intersect each other along the housing longitudinal axis.

Clause 19. The telescope of any of Clauses 16-18, wherein the two axes of rotation intersect each other along the housing longitudinal axis at an intersection point, wherein the housing rear end is positioned between the entrance pupil and the intersection point.

Clause 20. The telescope of any of Clauses 16-19, wherein the entrance pupil comprises a diameter, and the gimbal assembly cross-sectional profile fits within the entrance pupil diameter.

Clause 21. The telescope of any of Clauses 16-20, wherein in a forward look angle position, the gimbal assembly is positioned within a three-dimensional envelope that (i) extends along the longitudinal axis and (ii) is bounded by a prism having the housing cross-sectional profile.

Clause 22. The telescope of any of Clauses 16-21, wherein the gimbal assembly comprises first and second motors for rotating the housing about the two axes of rotation, wherein the first motor is positioned along a beam path of light received into the housing and the second motor is positioned outside the beam path.

Clause 23. The telescope of Clause 22, wherein the first motor comprises a hollow core for permitting the light to pass therethrough along the beam path.

Clause 24. The telescope of any of Clauses 16-17, wherein the telescope comprises a reflecting telescope.

Clause 25. A compact reflecting telescope as in any of the preceding Clauses, wherein the entrance pupil is configured for permitting entrance of a cylinder of light rays into the telescope, wherein a primary mirror is configured to reflect the cylinder of light rays toward a secondary mirror, the secondary mirror being positioned outside of the cylinder of light rays to provide an unobscured light path.

Clause 26. A compact reflecting telescope comprising: a housing defining an entrance pupil for permitting entrance of a cylinder of light rays into the telescope; a primary mirror configured to reflect the cylinder of light rays toward a secondary mirror, the secondary mirror being positioned outside of the cylinder of light rays to provide an unobscured light path.

Clause 27. The telescope of Clause 25, wherein the primary mirror is configured to reflect light towards the secondary mirror at an angle of between about 30° and about 80°.

Clause 28. The telescope of Clause 27, wherein the primary mirror is configured to reflect light towards the secondary mirror at an angle of between about 35° and about 60°.

Clause 29. The telescope of Clause 28, wherein the primary mirror is configured to reflect light towards the secondary mirror at an angle of between about 40° and about 50°.

Clause 30. A compact reflecting telescope as shown in any of the figures or description provided herein.

Other Remarks

In one aspect, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

Unless specifically stated otherwise, the term some refers to one or more. Pronouns in the masculine (e.g., his) include the feminine and neuter gender (e.g., her and its) and vice versa. Headings and subheadings, if any, are used for convenience only and do not limit the invention.

The word exemplary is used herein to mean serving as an example or illustration. Any aspect or design described herein as exemplary is not necessarily to be construed as preferred or advantageous over other aspects or designs. In one aspect, various alternative configurations and operations described herein may be considered to be at least equivalent.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. In one aspect, some of the dimensions are for clarity of presentation and are not to scale.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

A phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one or more aspects, the terms "substantially" and "approximately" may provide an industry-accepted tolerance for their corresponding terms and/or relativity between items. Such an industry-accepted tolerance may range from less than one percent to 10 percent.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using a phrase means for or, in the case of a method claim, the element is recited using the phrase step for. Furthermore, to the extent that the term include, have, or the like is used, such term is intended to be inclusive in a manner similar to the term comprise as comprise is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A compact reflecting telescope comprising:
   a housing defining an entrance pupil and a longitudinal axis;
   a primary mirror, positioned along the longitudinal axis, configured to reflect light passing through the entrance pupil toward a series of fold mirrors such that reflected light passes along a light path toward an exit pupil, wherein the primary mirror is positioned between the entrance pupil and the exit pupil; and
   a final fold mirror disposed along the light path at the exit pupil, wherein the final fold mirror comprises a dejitter mirror.

2. The telescope of claim 1, wherein the primary mirror is positioned between the final fold mirror and the entrance pupil.

3. The telescope of claim 2, wherein the light passing through the entrance pupil extends axially within a cylinder of the housing, the cylinder defining an imaginary cylinder envelope that extends axially beyond the primary mirror, and wherein the final fold mirror is disposed within the cylinder envelope behind the primary mirror.

4. The telescope of claim 2, wherein the housing comprises a cross-sectional profile normal to the longitudinal axis, and the exit pupil is positioned within an imaginary three-dimensional envelope that (i) extends along the longitudinal axis and (ii) has the housing cross-sectional profile.

5. The telescope of claim 1, wherein the final fold mirror comprises a steering mirror.

6. The telescope of claim 1, wherein the series of fold mirrors comprises four fold mirrors.

7. The telescope of claim 1, wherein each fold mirror in the series of fold mirrors comprises a diameter that is smaller than a diameter of the preceding fold mirror in the series.

8. An articulating telescope comprising:
   a housing comprising an entrance pupil, a rear end opposite the entrance pupil, a longitudinal axis extending between the entrance pupil and the rear end, the housing having a cross-sectional profile normal to the longitudinal axis;
   a primary mirror, positioned along the longitudinal axis, configured to reflect light passing through the entrance pupil toward a series of fold mirrors such that reflected light passes along a light path toward an exit pupil, wherein the primary mirror is positioned between the entrance pupil and the exit pupil;
   a dejitter mirror disposed along the light path at the exit pupil; and
   a gimbal assembly coupled to the rear end of the housing, the gimbal assembly having a cross-sectional profile less than the housing cross-sectional profile, the gimbal assembly being configured to provide rotational movement of the housing about at least two axes of rotation.

9. The telescope of claim 8, wherein the two axes of rotation intersect the housing longitudinal axis.

10. The telescope of claim 8, wherein the two axes of rotation intersect at a center of the last fold mirror.

11. The telescope of claim 8, wherein the two axes of rotation intersect each other along the housing longitudinal axis.

12. The telescope of claim 8, wherein the two axes of rotation intersect each other along the housing longitudinal axis at an intersection point, wherein the housing rear end is positioned between the entrance pupil and the intersection point.

13. The telescope of claim 8, wherein the entrance pupil comprises a diameter, and the gimbal assembly cross-sectional profile fits within the entrance pupil diameter.

14. The telescope of claim 8, wherein in a forward look angle position, the gimbal assembly is positioned within an imaginary three-dimensional envelope that (i) extends along the longitudinal axis and (ii) has the housing cross-sectional profile.

15. The telescope of claim 8, wherein the gimbal assembly comprises first and second motors for rotating the housing about the two axes of rotation, wherein the first motor is positioned along a beam path of light received into the housing and the second motor is positioned outside the beam path.

16. A compact reflecting telescope comprising:
   a housing defining an entrance pupil for permitting entrance of a cylinder of light rays into the telescope;
   a primary mirror configured to reflect the cylinder of light rays toward a secondary mirror, the secondary mirror being positioned outside of the cylinder of light rays to provide an unobscured light path, the secondary mirror reflecting the light rays along a light path toward an exit pupil; and
   a dejitter mirror disposed along the light path at the exit pupil.

17. The telescope of claim 16, wherein the primary mirror is configured to reflect light towards the secondary mirror at an angle of between about 30° and about 80°.

18. The telescope of claim 17, wherein the angle is between about 35° and about 60°.

19. The telescope of claim 18, wherein the angle is between about 40° and about 50°.

20. The telescope of claim 18, wherein the primary mirror is positioned between the entrance pupil and the exit pupil.

* * * * *